US011916777B2

(12) United States Patent
Vasseur et al.

(10) Patent No.: US 11,916,777 B2
(45) Date of Patent: Feb. 27, 2024

(54) LEARNING SLA VIOLATION PROBABILITY FROM INTELLIGENT FINE GRAINED PROBING

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); David Tedaldi, Zurich (CH); Pierre-André Savalle, Rueil-Malmaison (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/368,165

(22) Filed: Jul. 6, 2021

(65) Prior Publication Data

US 2023/0008106 A1    Jan. 12, 2023

(51) Int. Cl.
*H04L 45/00* (2022.01)
*H04L 43/10* (2022.01)
(Continued)

(52) U.S. Cl.
CPC ............ *H04L 45/22* (2013.01); *H04L 43/087* (2013.01); *H04L 43/0829* (2013.01);
(Continued)

(58) Field of Classification Search
CPC ... H04L 45/22; H04L 43/0829; H04L 43/087; H04L 43/0888; H04L 43/10; H04L 43/12; H04L 41/147; H04L 43/08
See application file for complete search history.

(56) References Cited

U.S. PATENT DOCUMENTS 7,912,934 B1 *   3/2011  Melton ................ H04L 41/083
                                                       709/227
10,904,125 B2    1/2021  Kolar et al.
(Continued)

FOREIGN PATENT DOCUMENTS

WO    WO-2020086092 A1 *   4/2020   ........... H04L 43/062

OTHER PUBLICATIONS

Y. Liu and C. An, "Cost Efficient Internet Path Tracking Based on Routing Changes Prediction," 2019 IEEE 38th International Performance Computing and Communications Conference (IPCCC), London, UK, 2019, pp. 1-8, doi: 10.1109/IPCCC47392.2019.8958758. (Year: 2019).*

*Primary Examiner* — Patrice L Winder
(74) *Attorney, Agent, or Firm* — BEHMKE INNOVATION GROUP LLC; James M. Behmke; James J. Wong

(57) ABSTRACT

In one embodiment, a device obtains a first set of measurements of a path metric for a path in a network that are measured using periodic probing of the path. The device obtains a second set of measurements of the path metric for the path that are measured using fine-grained probing of the path at a higher frequency than that of the periodic probing. The device generates a predictive model that predicts values of the path metric, based on the first set of measurements and on the second set of measurements. The device causes, based on a value of the path metric predicted by the predictive model, traffic to be rerouted from the path to another path in the network.

16 Claims, 10 Drawing Sheets

(51) Int. Cl.
*H04L 43/0829* (2022.01)
*H04L 43/087* (2022.01)
*H04L 43/0888* (2022.01)
*H04L 43/12* (2022.01)

(52) U.S. Cl.
CPC .......... *H04L 43/0888* (2013.01); *H04L 43/10* (2013.01); *H04L 43/12* (2013.01)

(56) References Cited

U.S. PATENT DOCUMENTS

| | | | |
|---|---|---|---|
| 2007/0217448 A1* | 9/2007 | Luo | H04L 47/283 |
| | | | 370/468 |
| 2009/0097409 A1* | 4/2009 | Akhter | H04L 43/12 |
| | | | 370/252 |
| 2012/0163227 A1 | 6/2012 | Kannan et al. | |
| 2015/0023186 A1* | 1/2015 | Vasseur | H04L 43/10 |
| | | | 370/252 |
| 2018/0013587 A1* | 1/2018 | Vasseur | H04L 12/4641 |
| 2018/0123910 A1* | 5/2018 | Fitzgibbon | H04L 43/08 |
| 2018/0367445 A1* | 12/2018 | Bajaj | H04L 45/22 |
| 2020/0007430 A1* | 1/2020 | Klemetti | H04L 45/08 |
| 2020/0084152 A1 | 3/2020 | Zhang et al. | |
| 2020/0153701 A1* | 5/2020 | Mohan | H04L 41/5009 |
| 2020/0204460 A1 | 6/2020 | Schneider et al. | |
| 2020/0245169 A1 | 7/2020 | Bhagavatula et al. | |
| 2020/0296023 A1* | 9/2020 | Kumar | H04L 43/20 |
| 2020/0396135 A1* | 12/2020 | Ma | H04L 41/12 |

\* cited by examiner

LEARNING SLA VIOLATION PROBABILITY FROM INTELLIGENT FINE GRAINED PROBING

TECHNICAL FIELD

The present disclosure relates generally to computer networks, and, more particularly, to learning service level agreement (SLA) violation probability from intelligent fine grained probing.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Traditional application-aware routing used in SD-WANs typically rely on active probing of the network paths, to detect and mitigate against SLA violations. Such an approach is reactive in nature, meaning that a problem has already occurred before it is detected. In addition, such reactive approaches also rely on simple statistics (e.g., mean and standard deviations) for the path metrics, to detect problems. Thus, reroutes are only triggered when the violations are extremely pronounced. Testing, however, has revealed that many problems are transient or subtle, leaving them undetected.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
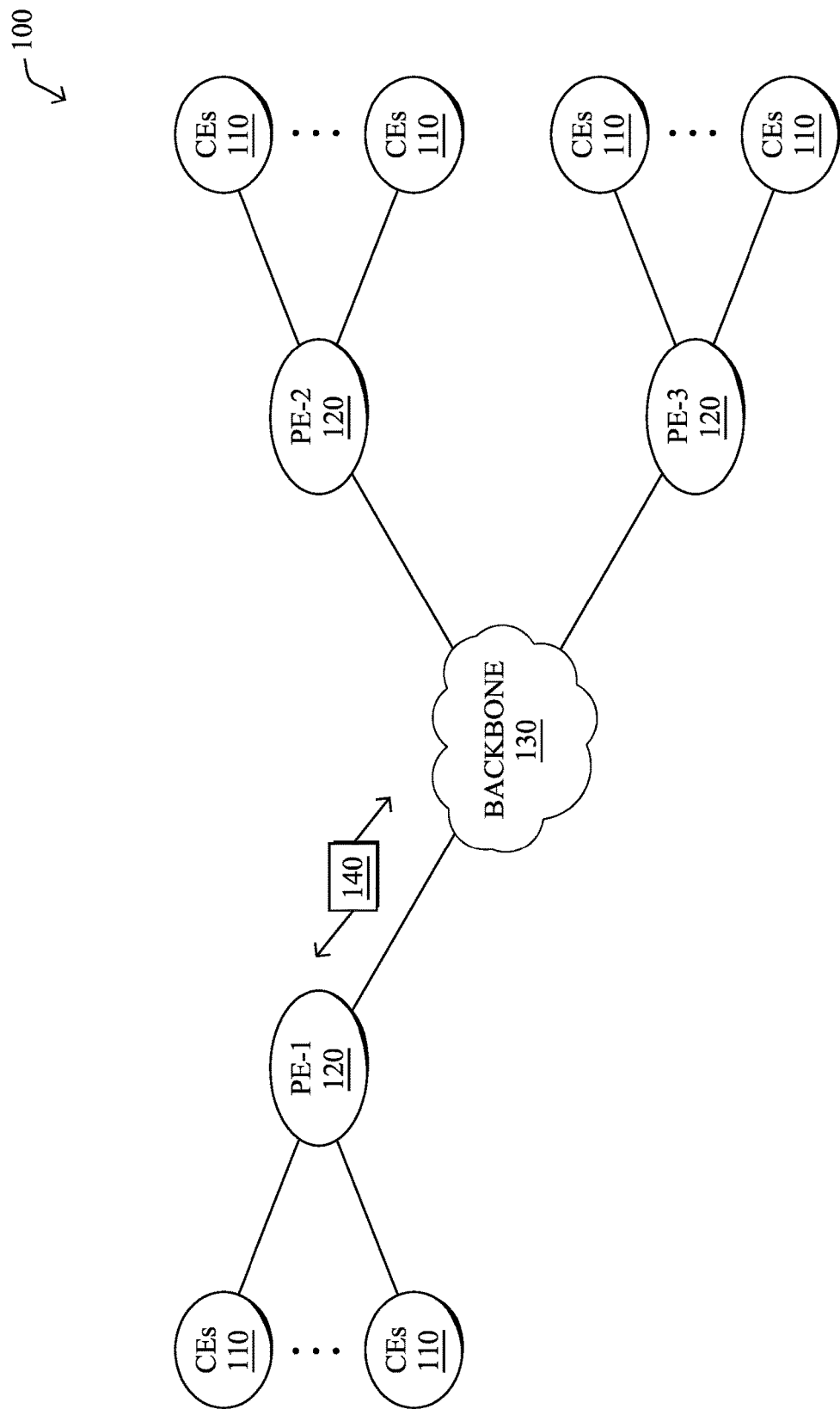
FIGS. 1A-1B illustrate an example communication network.

According to one or more embodiments of the disclosure, a device obtains a first set of measurements of a path metric for a path in a network that are measured using periodic probing of the path. The device obtains a second set of measurements of the path metric for the path that are measured using fine-grained probing of the path at a higher frequency than that of the periodic probing. The device generates a predictive model that predicts values of the path metric, based on the first set of measurements and on the second set of measurements. The device causes, based on a value of the path metric predicted by the predictive model, traffic to be rerouted from the path to another path in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
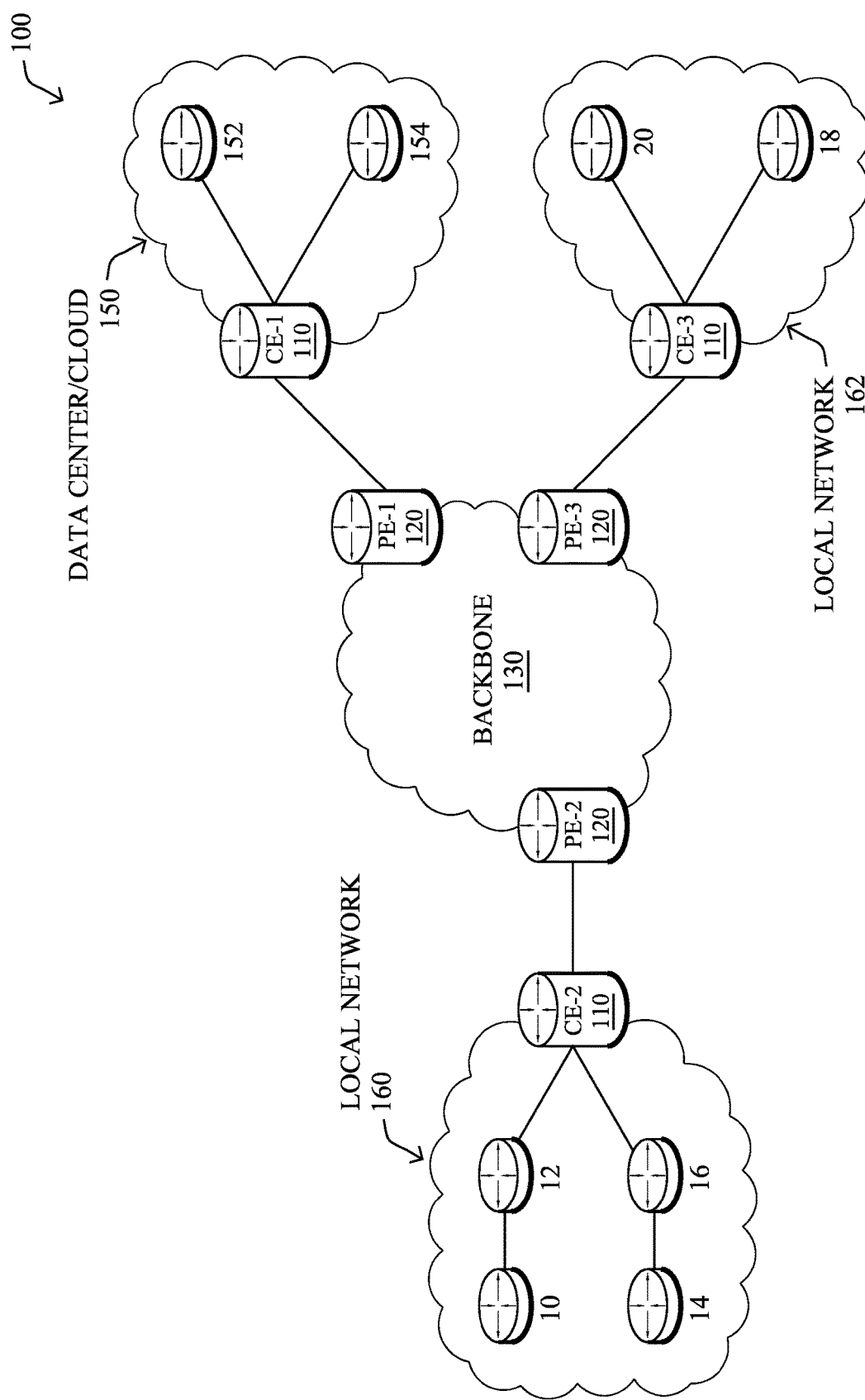

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
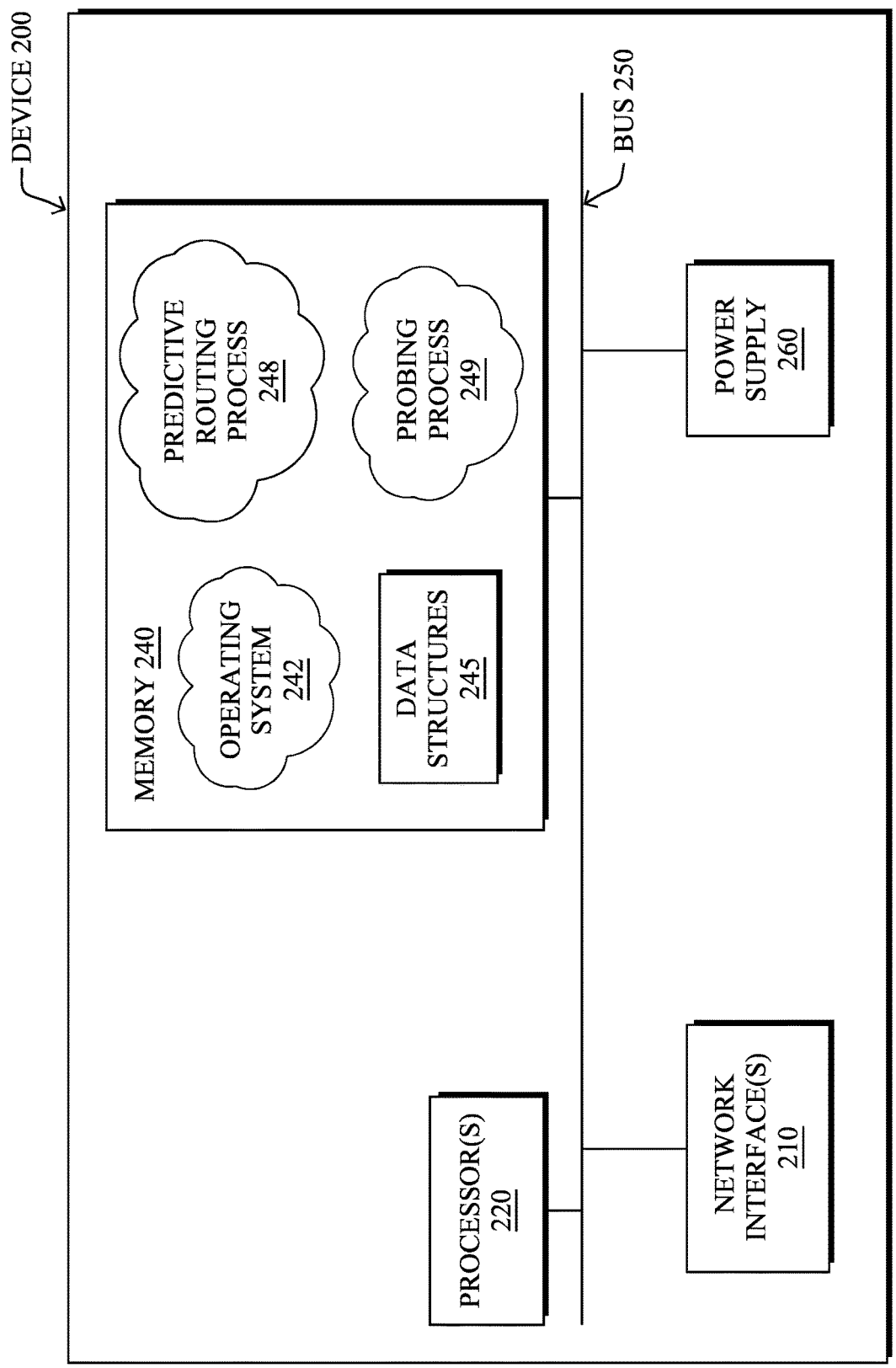
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242

(e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a probing process 249 may include computer executable instructions that, when executed by processor(s) 220, cause device 200 to perform the techniques described herein. To do so, in some embodiments, predictive routing process 248 and/or a probing process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a probing process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a probing process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
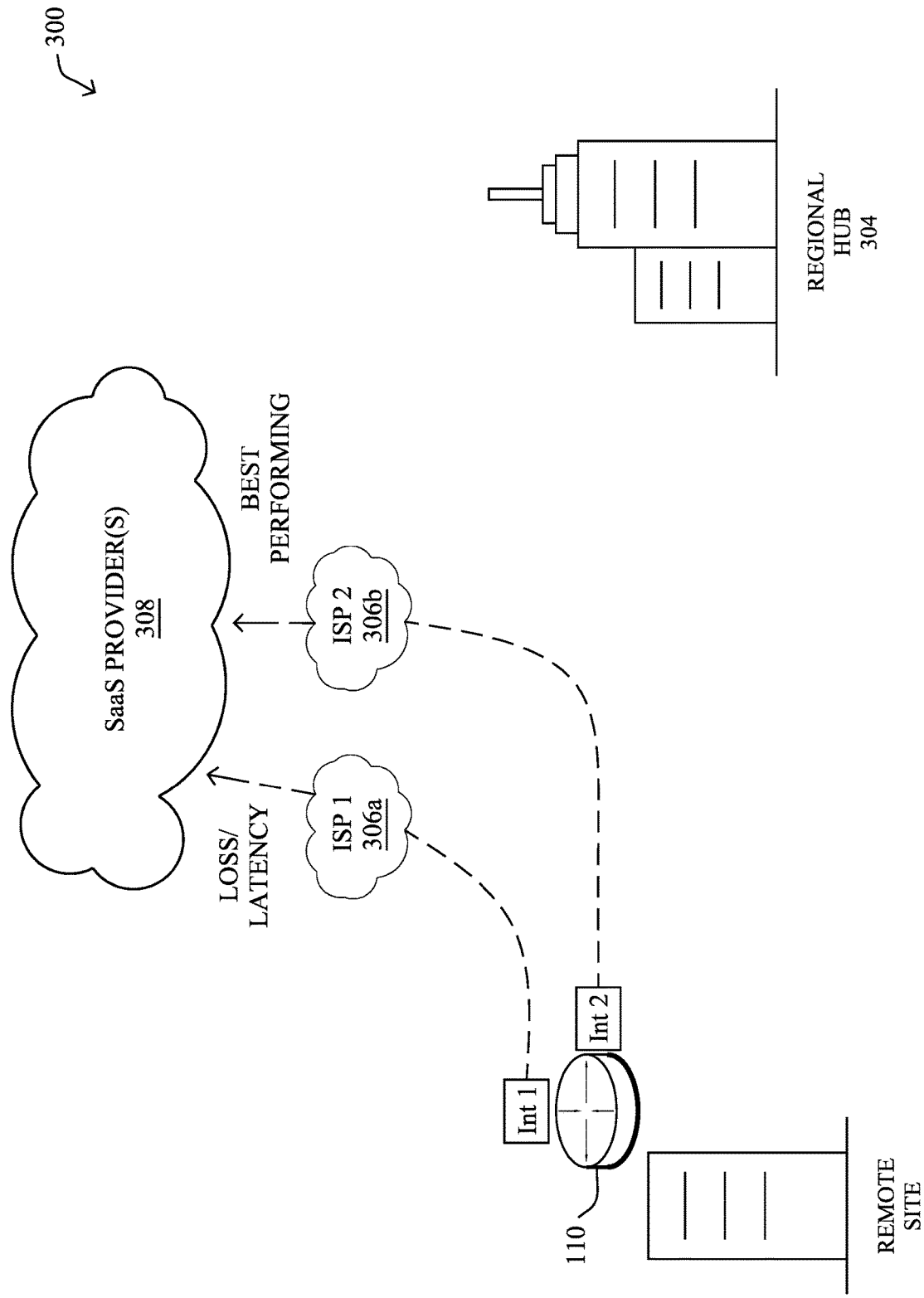
FIGS. 3A-3B illustrate example network deployments.
Figure 3B:
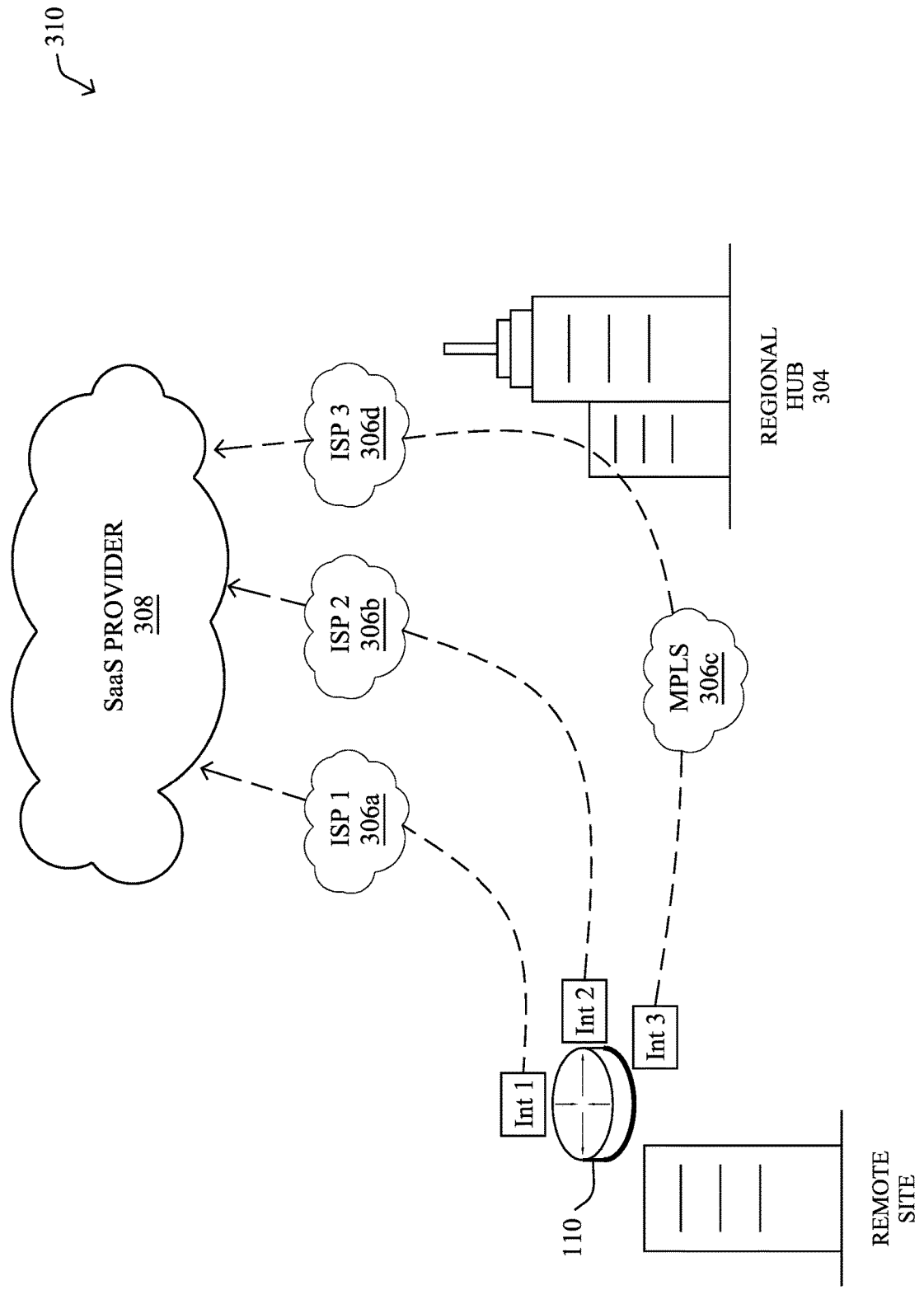

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
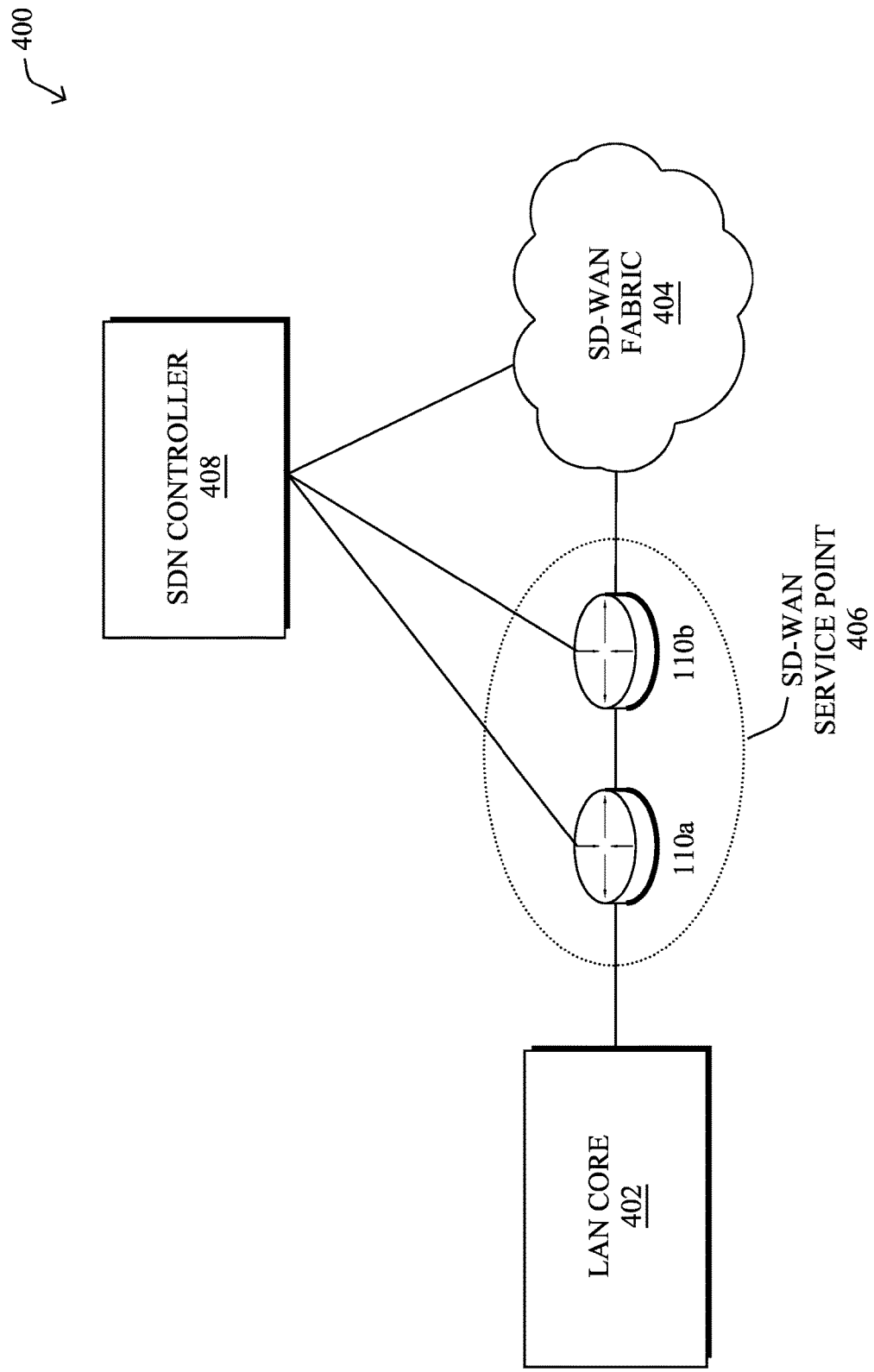
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast pith the notion of an informed decision.

SLA failures are very common in the Internet and a good proportion of them could be avoided (e.g., using an alternate path), if predicted in advance.

Figure 4B:
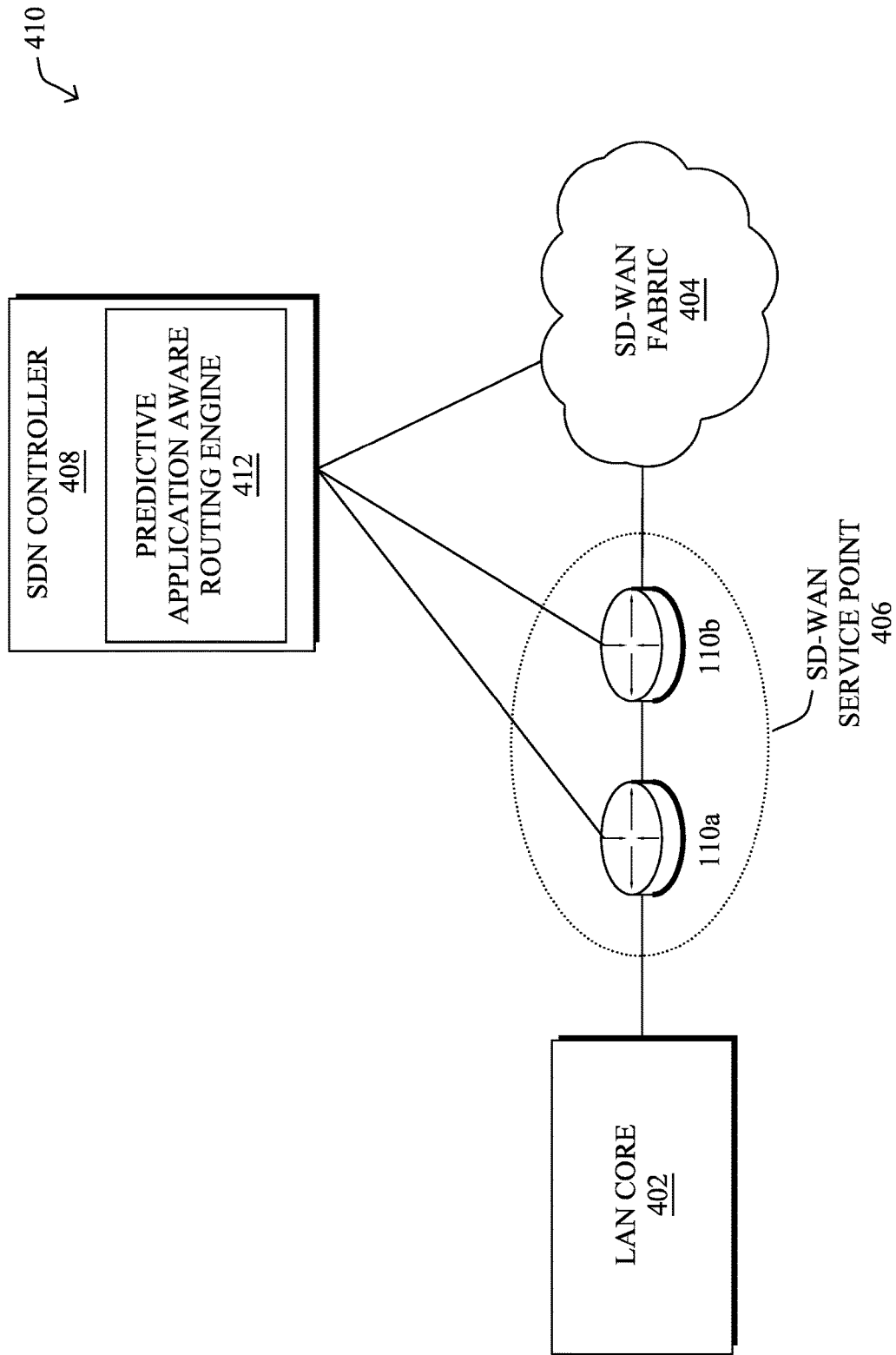

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Interne(thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive and reactive routing solutions typically rely on active probing to detect and mitigate against SLA violations. For instance, Bidirectional Forwarding Detection (BFD) or Internet Control Message Protocol (ICMP) probes may be sent periodically along a path, to measure its performance in terms of loss, delays, jitter, throughput, etc. Here, the probing is often done on a coarse-grained basis with relatively long intervals between probes and the path metrics are evaluated using simple statistics (e.g., the mean and standard deviation of the loss, delay, etc.). Consequently, routing decisions based on such probing can often fail to account for transient or subtle problems along the path. For instance, experimentation has shown that certain path conditions can extremely degrade the QoE of an application, even though the probed network metrics from the SD-WAN path were well within the bounds of the SLA.

Learning SLA Violation Probability from Intelligent Fine Grained Probing

The techniques herein introduce probing mechanisms to adaptively perform fine-grained probing across a network with the goal of providing much more accurate estimates of the probability of an SLA violation occurring. In some aspects, the techniques herein learn a path model that predicts the true probability of violations based on the output of classical probes. Furthermore, fine-grained probing can also be carried out in a fully automated manner, maximizing the amount of information obtained from them, while limiting the impact on the network deployment.

Illustratively, the techniques described herein may be performed by hardware, software, and/or firmware, such as in accordance with probing process 249, which may include computer executable instructions executed by the processor 220 (or independent processor of interfaces 210) to perform functions relating to the techniques described herein, in conjunction with predictive routing process 248.

Specifically, according to various embodiments, a device obtains a first set of measurements of a path metric for a path in a network that are measured using periodic probing of the path. The device obtains a second set of measurements of the path metric for the path that are measured using fine-grained probing of the path at a higher frequency than that of the periodic probing. The device generates a predictive model that predicts values of the path metric, based on the first set of measurements and on the second set of measurements. The device causes, based on a value of the path metric predicted by the predictive model, traffic to be rerouted from the path to another path in the network.

Figure 5:
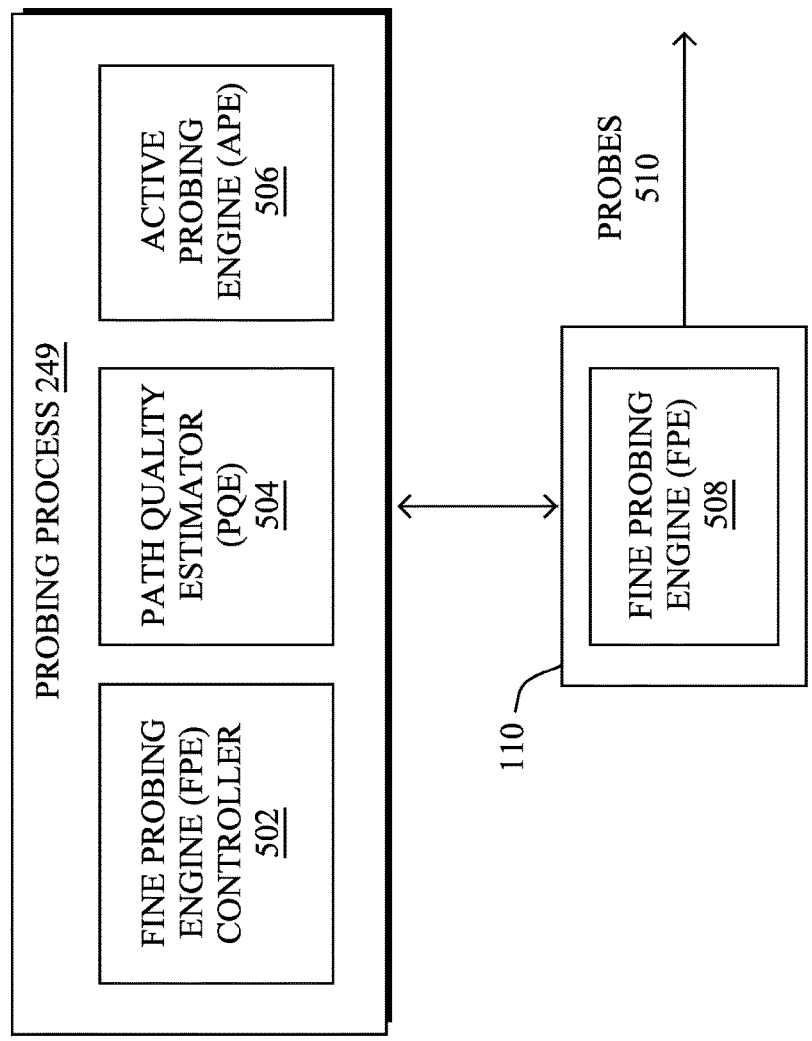
FIG. 5 illustrates an example architecture for probing a network path.

Operationally, FIG. 5 illustrates an example architecture 500 for a correlation analysis process, according to various embodiments. At the core of architecture 500 is probing process 249, which may be executed by a controller for a network or another device in communication therewith. For instance, probing process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, probing process 249 may operate in conjunction with a predictive application aware routing engine, such as predictive application aware routing engine 412, or directly implemented as a component thereof, in some embodiments.

As shown, probing process 249 may include any or all of the following components: a fine probing engine (FPE) controller 502, a path quality estimator (PQE) 504, and/or an active probing engine (APE) 506. As would be appreciated, the functionalities of these components may be combined or omitted, as desired. In addition, these components may be implemented on a singular device or in a distributed manner, in which case the combination of executing devices can be viewed as their own singular device for purposes of executing probing process 249.

In various embodiments, probing process 249 may include fine probing engine (FPE) controller 502 that controls the operation of a corresponding FPE 508 executed by a networking device in the network, such as router 110 shown. In general, the role of FPE 508 is to actively probe a given destination along a given path by sending probes 510 along the path. This may be done, for instance, in addition to any periodic or 'standard' probing by the networking device (e.g., periodic BFD probing), so as to gain a more accurate picture of the network state at any given point in time.

In one embodiment, FPE 508 may also be application-aware such that the size, type, and/or rate of probes 510 are adjusted to replicate the packets of the application of interest. For instance, FPE controller 502 may configure FPE 508 to replicate a voice flow such that probes 510 are sent using UDP instead of TCP, with a packet rate in the order of 50 packets per second and packet sizes around 28 bytes. In other cases, FPE controller 502 may configure FPE 508 to send probes 510 as HTTP probes, etc. All such parameters may be dynamically computed thanks to dynamics packet capture (PCAP) files for non-encrypted traffic related to the applications of interest.

The main purpose of FPE 508 and FPE controller 502 is to measure the path metrics along a path with high precision, such as the loss, latency, jitter, and/or throughput of the path. Here, router 110 may still send BFD or IMP probes periodically, such as approximately every second, which provides a course-grained view of these path metrics. In contrast, FPE 508 may send probes 510 at a greater frequency, to obtain a more fine-grained view of the path metrics. Doing so can yield a full picture of the behavior of the path and represented by a statistical description of these metrics (e.g., confidence intervals). Of course, the operation of FPE 508 is much more disruptive than a regular BFD or ICMP probe sent every second or so. As a result, it must be used with caution, which is the role of the Active Probing Engine (APE) 506, described below.

Another potential component of probing process 249 is path quality estimator (PQE) 504, which is responsible for predicting the true QoS metric(s) for the path. In one embodiment, POE 504 may do so by constructing one or more regression or other machine learning-based models that ingest any or all of the following:

Historical information about the loss, latency, jitter, throughput, etc. obtained from traditional probe information obtained from the network, often resulting from averaging a collection of BFD or ICMP probes over a given time interval (e.g., 1 minute or more). This information is typically very inaccurate.

Features derived from past measurements by FPE 508 of the path. These features may include the resulting QoS measurements (loss, latency, jitter, etc.), but may also include statistics about every probe 510. The ensemble of this information is called a "profile," which essentially provides a picture of the true experience of an application along a given path. This picture can be compared to the inaccurate, yet always available, information from classical probing.

Every path is expected to have different characteristics and, therefore, a different mapping between the average metrics measured by classical probes and the "true" value as measured by FPE 508.

In another embodiment, FPE controller 502 may communicate with a user interface, to allow a user of the system to specify which paths, application, etc. should be subjected to the additional probing mechanisms provided by probing process 249. For instance, a network administrator may specify to FPE controller 502 that fine probing should only be performed for specific paths carrying critical traffic, a high number of flows, or the like.

In one embodiment, PQE 504 learns a new model for each path independently. another embodiment, PQE 504 may train a single model for all or multiple paths paths by providing additional features such as path profile (e.g., long-term mean and standard deviation of QoS values).

In some instances, PQE 504 may output a distribution of the path QoS metric of interest, or statistics thereof (e.g., $10^{th}$ percentile, median, and $90^{th}$ percentile). Indeed, given an average loss over one minute provided by traditional BFD probing and a series of past FPE profiles, there is never any absolute certainty as to the 'true' value of the QoS metrics. Thus, PQE 504 may also retrain its model upon detecting a substantial property change of the path, such as in the face of a new BGP advertisement notifying a changed set of traversed autonomous systems, a significant change of the Probability Density Function (PDF) for delay or loss, etc.

Figure 6:
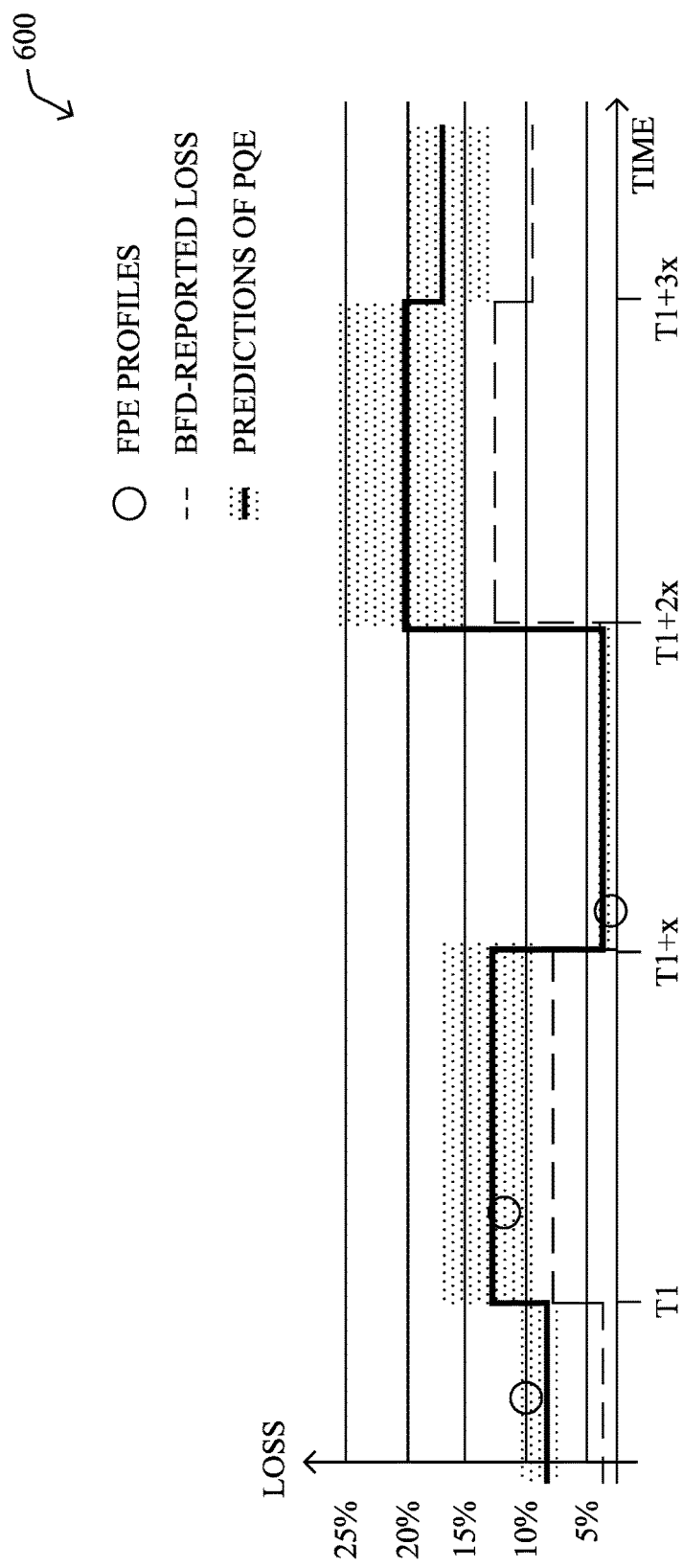
FIG. 6 illustrates an example plot of loss along a network path.

FIG. 6 illustrates an example plot 600 of loss along a network path, according to various embodiments. More specifically, periodically-sent BFD probes may be sent at a periodicity of x, such as at times T1, T1+x, T1+2x, T1+3x, etc. This results in a series of loss measurements for the path for each of the corresponding time periods. In addition to the BFD probes, the networking device executing FPE 508 (e.g., router 110) may also send probes at higher frequencies than that of x, denoted as the FPE profiles shown.

Indeed, as shown, the loss measured by the probing by FPE 508 tends to deviate from the loss for the time period measured by the BFD probes. From this, PQE 504 can learn to predict the 'true' loss yielded by FPE 508 based on historical data. Here, the additional FPE probing can be combined with the BFD-reported loss, to model the 'true' loss along the path during any given time period (e.g., in terms of a probabilistic range of potential values for the loss, etc.).

Referring again to FIG. 5, probing process 249 may also include active probing engine (APE) 506, which is configured to decide where and when to run fine-grained probing in the network. To do so APE 506 may use an active learning strategy in an attempt to maximize the information available to PQE 504 for learning, while still limiting the impact on the target network. This is because additional fine-grained probing by FPE 508 can potentially be disruptive to the existing traffic. Thus, APE 506 may monitor the entire network and estimate the expected information gain G from running an FPE profile along a given path, for a given app, at a given time. The gain G is roughly inversely proportional to the error E(x) of PQE 504 for a given input feature vector x.

APE 506 may then decide how to use the allocated budget of tests it can run every hour, day, week, or other time period, in order to maximize G (and thereby reduce the error Example optimization approaches that APE 506 can leverage to do this include Particle Swarm Optimization, Genetic Algorithms, Simulated Annealing, greedy algorithms, and the like.

APE 506 may also be configured by a user with the paths, sites, or VPNs that are deemed sensitive are not eligible for FPE probing, so as not to impact their traffic. Similarly, some applications may be protected and no FPE profile will be performed while they are active.

Based on the above analysis, APE 506 may operate in conjunction with FPE controller 502 to configure FPE 508 to run a test for the path, time, and application selected by the optimization algorithm of APE 506. The results may then be collected back by APE 506 and made available in the form of training and validation set to PQE 504. The training portion of the results is used to update the regression or other path model of PQE 504, whereas the validation portion allows APE 506 to estimate errors E(x) for another round of tests.

In some embodiments, APE 506 may use a Bayesian optimization strategy to estimate the errors E(x), so that it naturally balances exploration (triggering tests in scenarios for which it has very little to no data) and exploitation (triggering tests in scenarios that have a large error).

In yet another embodiment, APE 506 may operate in conjunction with FPE controller 502 to configure FPE 508 with so-called trigger patterns which should trigger the collection of high-frequency information. In general, a trigger pattern may consist of a set of feature vectors {x1, . . . , xN}, that may be sent to the eligible networking devices (e.g., those not along paths deemed sensitive, those not routing traffic for certain applications, etc.). When FPE 508 observes that recent low-frequency, averaged QoS data matches a given pattern (e.g., when the feature vector corresponding to QoS on a given local path other than the past minute has a distance less than a threshold to one of the trigger patterns), it may start collecting high-frequency information and report it to FPE controller 502. This mechanism allows for the collection of high-frequency information when disruptions or specific events occur, even if it is not possible to predict on which path and at which time the events will occur. To determine trigger patterns, APE 506 may use a similar approach as described above, by identifying in which circumstances (as represented by a feature vector x) the error E(x) was high.

In further embodiments, PQE 504 may estimate the violation probabilities on behalf of the reactive or predictive routing engine in the network, such as predictive application aware routing engine 412. In doing so, this allows the routing engine to much more reliably choose the best path for an application, and not simply on arbitrary thresholds that need to be crossed to consider the application as requiring mitigation actions, such as rerouting its traffic.

Figure 7:
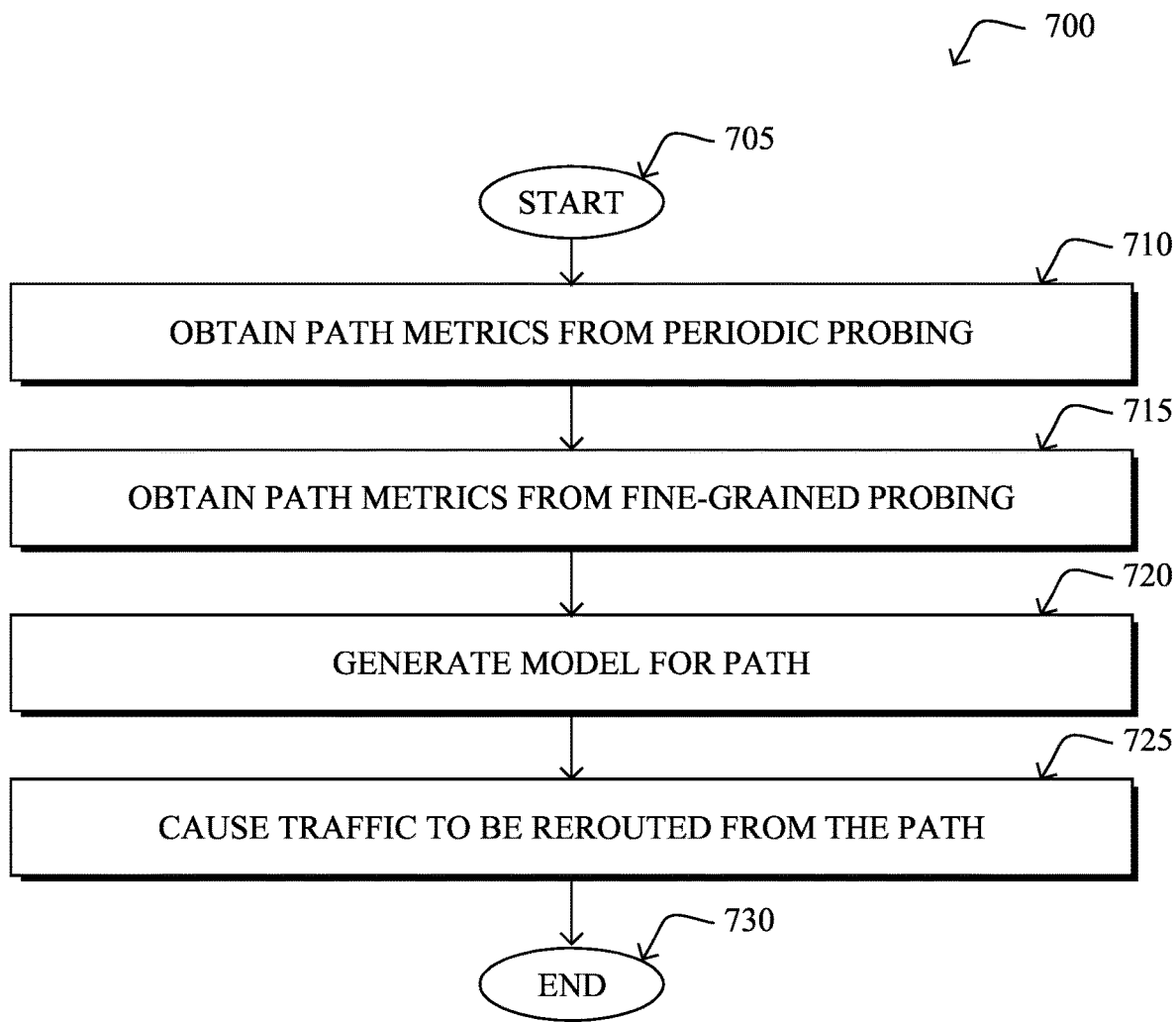
FIG. 7 illustrates an example simplified procedure for modeling a path metric for a network path.

FIG. 7 illustrates an example simplified procedure 700 (e.g., a method) for modeling a path metric for a network path, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., probing process 249), to provide a supervisory service to a network. The procedure 700 may start at step 705, and continues to step 710, where, as described in greater detail above, the device may obtain a first set of measurements of a path metric for a path in a network that are measured using periodic probing of the path. For instance, the first set of measurements may be measured by sending BFD, ICMP, or other probes, periodically, along the path. The path metric may be any performance metric for the path such as at least one of: packet loss, delays, jitter, throughput, or the like.

At step 715, as detailed above, the device may obtain a second set of measurements of the path metric for the path that are measured using fine-grained probing of the path at a higher frequency than that of the periodic probing. In some embodiments, the device may deploy a probing engine to an edge router for execution, to perform the fine-grained probing of the path. In further embodiments, the device may provide a trigger pattern to a router associated with the path, whereby the router initiates the fine-grained probing of the path when measurements in the first set of measurements match the trigger pattern. In yet further embodiments, the fine-grained probing may entail sending packets along the path that mimic packet characteristic for traffic of a particular online application. For instance, the fine-grained probes may use the same protocol used by packets of the traffic, the same size of packets of the traffic, and/or be sent according to timing associated with packets of the traffic.

At step 720, the device may generate a predictive model that predicts values of the path metric, based on the first set of measurements and on the second set of measurements, as described in greater detail above. As would be appreciated, by supplementing the periodic measurements with more fine-grained measurements, the model may better predict the values of the path metric. In some embodiments, the device may also determine a control strategy for the fine-grained probing that seeks to optimize an accuracy of the predictive model while minimizing an amount of fine-grained probing performed along the path.

At step 725, as detailed above, the device may cause, based on a value of the path metric predicted by the predictive model, traffic to be rerouted from the path to another path in the network. In some embodiments, the device may do so by providing the predicted value of the path metric, or the predictive model itself, to a routing engine associated with the network. In turn, the routing engine may use the predicted value of the path metric to make its rerouting decision for the traffic on the path. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the intelligent performance of path probing to supplement the traditional probing performed periodically using BGP, ICMP, etc. More specifically, fine-grained path probing can be performed using the techniques herein to garner a clearer picture of the performance of a network path, while balancing the potential impact of such probing on the traffic conveyed via the path.

While there have been shown and described illustrative embodiments that provide for the intelligent probing of network paths for purposes of predictive routing, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, a first set of measurements of a path metric for a path in a network that are measured using periodic probing of the path;
obtaining, by the device, a second set of measurements of the path metric for the path that are measured using fine-grained probing of the path at a higher frequency than that of the periodic probing by providing a trigger pattern comprising a set of feature vectors to a router associated with the path, wherein the router initiates the fine-grained probing of the path when measurements in the first set of measurements match the trigger pattern;
generating, by the device, a predictive model that predicts values of the path metric, based on the first set of measurements and on the second set of measurements; and
causing, by the device and based on a value of the path metric predicted by the predictive model, traffic to be rerouted from the path to another path in the network,
wherein the second set of measurements is obtained based on a control strategy that optimizes an accuracy of the predictive model while minimizing an amount of the fine-grained probing performed along the path.

2. The method as in claim 1, wherein the periodic probing of the path comprises Bidirectional Forwarding Detection (BFD) or Internet Control Message Protocol (ICMP) probes being periodically sent along the path.

3. The method as in claim 1, wherein the path metric comprises at least one of: packet loss, delay, jitter, or throughput.

4. The method as in claim 1, wherein causing traffic to be rerouted from the path to another path in the network comprises:
providing the value of the path metric predicted by the predictive model, or the predictive model itself, to a routing engine associated with the network.

5. The method as in claim 1, further comprising:
deploying, by the device, a probing engine to an edge router for execution, to perform the fine-grained probing of the path.

6. The method as in claim 1, wherein the fine-grained probing of the path comprises sending packets along the path that mimic packet characteristics for traffic of a particular online application.

7. The method as in claim 6, wherein the packet characteristics comprise one or more of: a protocol used by packets of the traffic, a size of the packets of the traffic, or a timing associated with packets of the traffic.

8. The method as in claim 1, wherein performance of the fine-grained probing of the path is controllable via one or more parameters that specifies the path or a particular application for which the fine-grained probing should be performed.

9. An apparatus, comprising:
one or more network interfaces;
a processor coupled to the one or more network interfaces and configured to execute one or more processes; and
a memory configured to store a process that is executable by the processor, the process when executed configured to:
obtain first set of measurements of a path metric for a path in a network that are measured using periodic probing of the path;
obtain a second set of measurements of the path metric for the path that are measured using fine-grained probing of the path at a higher frequency than that of the periodic probing by providing a trigger pattern comprising a set of feature vectors to a router associated with the path, wherein the router initiates the fine-grained probing of the path when measurements in the first set of measurements match the trigger pattern;
generate a predictive model that predicts values of the path metric, based on the first set of measurements and on the second set of measurements; and
cause, based on a value of the path metric predicted by the predictive model, traffic to be rerouted from the path to another path in the network,
wherein the second set of measurements is obtained based on a control strategy that optimizes an accuracy of the predictive model while minimizing an amount of the fine-grained probing performed along the path.

10. The apparatus as in claim 9, wherein the periodic probing of the path comprises Bidirectional Forwarding Detection (BFD) or Internet Control Message Protocol (ICMP) probes being periodically sent along the path.

11. The apparatus as in claim 9, wherein the path metric comprises at least one of: packet loss, delay, jitter, or throughput.

12. The apparatus as in claim 9, wherein the apparatus causes traffic to be rerouted from the path to another path in the network by:
providing the value of the path metric predicted by the predictive model, or the predictive model itself, to a routing engine associated with the network.

13. The apparatus as in claim 9, wherein the process when executed is further configured to:
deploy a probing engine to an edge router for execution, to perform the fine-grained probing of the path.

14. The apparatus as in claim 9, wherein the fine-grained probing of the path comprises sending packets along the path that mimic packet characteristics for traffic of a particular online application.

15. The apparatus as in claim 14, wherein the packet characteristics comprise one or more of: a protocol used by packets of the traffic, a size of the packets of the traffic, or a timing associated with packets of the traffic.

16. A tangible, non-transitory, computer-readable medium storing program instructions that cause a device to execute a process comprising:

obtaining, by the device, a first set of measurements of a path metric for a path in a network that are measured using periodic probing of the path;

obtaining, by the device, a second set of measurements of the path metric for the path that are measured using fine-grained probing of the path at a higher frequency than that of the periodic probing by providing a trigger pattern comprising a set of feature vectors to a router associated with the path, wherein the router initiates the fine-grained probing of the path when measurements in the first set of measurements match the trigger pattern;

generating, by the device, a predictive model that predicts values of the path metric, based on the first set of measurements and on the second set of measurements; and causing, by the device and based on a value of the path metric predicted by the predictive model, traffic to be rerouted from the path to another path in the network, wherein the second set of measurements is obtained based on a control strategy that optimizes an accuracy of the predictive model while minimizing an amount of the fine-grained probing performed along the path.

* * * * *

UNITED STATES PATENT AND TRADEMARK OFFICE
CERTIFICATE OF CORRECTION

PATENT NO. : 11,916,777 B2
APPLICATION NO. : 17/368165
DATED : February 27, 2024
INVENTOR(S) : Jean-Philippe Vasseur et al.

Page 1 of 1

It is certified that error appears in the above-identified patent and that said Letters Patent is hereby corrected as shown below:

In the Specification

Column 9, Line 35 please amend as shown:
in contrast with the notion of an informed decision.

Column 9, Line 62 please amend as shown:
net(thus optimizing the application experience while drasti- Column 12, Line 29 please amend as shown:
path independently. In another embodiment, PQE 504 may Column 13, Line 12 please amend as shown:
in order to maximize G (and thereby reduce the error E).

Signed and Sealed this
Twenty-first Day of May, 2024

Katherine Kelly Vidal
*Director of the United States Patent and Trademark Office*